(12) United States Patent
Lefkovitz (10) Patent No.: US 10,420,361 B2
(45) Date of Patent: *Sep. 24, 2019

(54) CITRUS PRESS DRINKING VESSEL

(71) Applicant: O2C GALACTIC, LLC, Chicago, IL (US)

(72) Inventor: Joshua A. Lefkovitz, Akron, OH (US)

(73) Assignee: O2C GALACTIC, LLC, Chicago, IL (US)

( * ) Notice: Subject to any disclaimer, the term of this patent is extended or adjusted under 35 U.S.C. 154(b) by 364 days.

This patent is subject to a terminal disclaimer.

(21) Appl. No.: 14/011,904

(22) Filed: Aug. 28, 2013

(65) Prior Publication Data

US 2014/0004242 A1 Jan. 2, 2014

Related U.S. Application Data

(63) Continuation-in-part of application No. 13/219,895, filed on Aug. 29, 2011, now Pat. No. 9,198,788, which is a continuation-in-part of application No. 12/961,828, filed on Dec. 7, 2010, now Pat. No. 8,613,402.

(51) Int. Cl.
*A23N 1/00* (2006.01)
*A47G 19/22* (2006.01)
*A47J 19/02* (2006.01)

(52) U.S. Cl.
CPC ......... *A23N 1/003* (2013.01); *A47G 19/2205* (2013.01); *A47J 19/022* (2013.01)

(58) Field of Classification Search
CPC ......... A23N 1/003; A47J 19/022; A47J 31/44; A47G 19/2205

USPC .......... 99/501, 502, 510; 241/100, 169.1, 69
See application file for complete search history.

(56) References Cited

U.S. PATENT DOCUMENTS

| 1,507,880 | A | * | 9/1924 | Zouvelos | A47J 19/02 366/155.1 |
| 4,309,942 | A | * | 1/1982 | Da Silva, Jr. | A47J 19/02 220/506 |
| 6,363,837 | B1 | * | 4/2002 | Sham | A47J 19/02 99/348 |
| 8,613,402 | B2 | * | 12/2013 | Lefkovitz | A47J 19/06 241/100 |
| 8,740,116 | B2 | * | 6/2014 | Lefkovitz | B65D 33/2525 241/169.1 |

FOREIGN PATENT DOCUMENTS

FR 2933593 A1 * 1/2010 ............ A47J 19/022

* cited by examiner

*Primary Examiner* — Faye Francis
(74) *Attorney, Agent, or Firm* — Thompson Coburn LLP (57) ABSTRACT

An improved hand operated citrus press is provided in direct operational combination with a liquid drinking vessel. The citrus press is provided removably connected to, and in fluid communication with, the liquid drinking vessel. The fluid contained within the drinking vessel can be infused with the essences from the ground or comminuted fruit from the citrus press. The fluid communication between the comminuting volume of the citrus press grinder assembly and the container allows these all natural ingredients to steep directly with the beverage, creating refreshingly flavored drinks that are as rich and natural in nutrients as its ingredients.

4 Claims, 7 Drawing Sheets

CITRUS PRESS DRINKING VESSEL

RELATED APPLICATIONS

The present application is a Continuation in Part of U.S. Ser. No. 13/219,895, filed on Aug. 29, 2011, and which was a Continuation in Part of U.S. Ser. No. 12/961,828, file on Dec. 7, 2010. Both parent applications are incorporated by reference as if fully rewritten herein.

BACKGROUND OF THE INVENTION

1. Field of the Invention

The present invention relates generally to a drinking container for enhancing a beverage with extracted edible and aromatic oils and, more particularly, to a hand grinding citrus press in combination with a liquid drinking vessel for the direct blending of freshly extracted citrus juice, oils and such into a drinking liquid in a continuous manner.

2. Description of the Related Art

Hand-held citrus presses are kitchen tools that are well known in the art. A typical design that is standard in commerce is an inverted cone or crown having alternating reamer blades and spaced slots upon which a citrus fruit such as a lemon, lime or grapefruit is manually impinged, twisted and grinded to allow for the release of fruit, juice, and oil. The blades scrape the fruit, while the slots are generally sized to allow passage of liquid while preventing passage of pits or seeds.

The use of such a hand held citrus press is capable of easily extracting the juice of one or a few fruit, but its use to create a citrus beverage is cumbersome, inefficient and generally not acceptable. High speed electronic juicers are currently available specifically for the creation of a fruit beverage, but such devices are cumbersome, expensive, creates excessive cleanup, and is generally looked at as excessive for the production of a single glass of citrus infused water or a similar essences infused beverage.

Consequently, a need does exist for providing a simple, easy, intuitively operated and inexpensive portable apparatus and method for the extraction of edible and aromatic oils with the purpose of directly blending or combining the fruit and the freshly extracted edible and aromatic oils and such with a liquid in a sealed drinking bottle.

SUMMARY OF THE INVENTION

It is therefore an object of the present invention to provide an improved essence extractor for comminuting of foodstuffs for the extraction of edible and aromatic oils in a drinking container.

It is a feature of the present invention to provide a hand grinding citrus press in combination with a liquid drinking vessel for the direct blending of freshly extracted citrus juice, oils and such into a drinking liquid while keeping the fruit separate from the liquid.

Briefly described according to one embodiment of the present invention, a hand operated citrus press of a generally conventional design is provided in direct operational combination with a liquid drinking vessel. The citrus press is provided removably connected to, and in fluid communication with, the liquid drinking vessel. The container, adapted as a drinking vessel, in which a drinking beverage contained therein can be infused with the essences from the ground or comminuted fruit from the citrus press. The citrus press can be internal or external to the vessel; either design will still result in direct infusion. The fluid communication between the comminuting volume of the citrus press grinder assembly, the fruit itself, and the container allows these all natural ingredients to steep directly with the beverage, creating refreshingly flavored drinks. When adapted for use with drinking water, a sport cap may be provided to provide a spill-proof sip.

In any such embodiment, the container can be modified to be operatively connected to the citrus press such that it is removably connected to the liquid dispensing container, as well as in fluid communication with the liquid volume while maintaining a sealed contained beverage. Therefore, the user can consume the liquid while the citrus press is still attached to the container, or the citrus press can removed prior to consuming the liquid. Placement of the citrus press can be the top, middle, bottom, or any specific orientation or configuration should be equivalent, given the fluid communication between the comminuted foodstuff and the liquid volume such that the extraction of edible, the edible itself, and aromatic oils can directly blend with any liquid contents of the volume.

An advantage of the present invention is that it allows the direct blending for freshly extracted edible, the edible itself, and aromatic oils from the fruit and such with a target diluent, such as water, effervescent water, vodka, etc., while allowing the user to drink from the vessel without first removing the citrus press.

Further, a preferred embodiment of the present invention is capable of being effectively hand operated, repeatedly used, easily cleaned and economical to obtain and operate.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Referring now to FIGS. 1-6, a hand grinding citrus press and juice extractor and liquid container combination, generally noted as 10, is shown according to the preferred embodiment of the present invention incorporating a citrus press 12 or hand operated fruit grinder assembly is removably attached to, and in fluid communication with, a liquid drinking vessel 14. A retention or separation sieve or separation mechanism 16 may be affixed between the citrus press 12 and drinking vessel 14 to allow for fluid communication between the extracted juices of the fruit, with retention of seed, rind or even pulp, depending upon the desired sieve 16 size.

The liquid vessel 14 is anticipated as being formed of stainless steel, or a clear polycarbonate or epoxy plastic that is free of PBA (Bis-Phenol A) to form a viewing window 18 allowing visual access to the dispensing volume 20. The vessel 14 itself may be adapted to any number of industrial designs and for various purposes. By way of example, the preferred embodiment is a drinking bottle having an upper replaceable lid 22 that is threadingly engaged with an upper opening 24 of the vessel 14. However, the vessel 14 may be adapted for use in conjunction with other uses.

As shown, the citrus press 12 is formed connectedly with the lower surface 26 of the drinking vessel 14. In such an embodiment, the bottom cap 28 can be threadingly engaged directly to the lower surface 26 of the drinking vessel 14. In this manner, a drinking beverage contained therein can be infused with the essences from ground or comminuted fruit that is created when a fruit is impinged between the bottom cap 28 and citrus press 12. The fluid communication between the comminuting volume of the citrus press 12 and the vessel 14 allows these all natural ingredients to steep directly with the beverage.

The citrus press 12 may be keyed in place and frictionally impinged between the drinking vessel 14 and bottom cap 28 in order to be secured during use. However, other methods for attaching and securing the citrus press 12 during use may be provided, including forming screw grooves about the outside perimeter in order to removably attach the press 12 directly to the bottom of the drinking vessel 14. The citrus press 12 may also be adapted to comprise a corking device for removably securing to a screw on vessel 72. window 18 allowing visual access to the dispensing volume 20. The vessel 14 itself may be adapted to any number of industrial designs and for various purposes. By way of example, the preferred embodiment is a drinking bottle having an upper replaceable lid 22 that is threadingly engaged with an upper opening 24 of the vessel 14. However, the vessel 14 may be adapted for use in conjunction with other uses.

As shown, the citrus press 12 is formed connectedly with the lower surface 26 of the drinking vessel 14. In such an embodiment, the bottom cap 28 can be threadingly engaged directly to the lower surface 26 of the drinking vessel 14. In this manner, a drinking beverage contained therein can be infused with the essences from ground or comminuted fruit that is created when a fruit is impinged between the bottom cap 28 and citrus press 12. The fluid communication between the comminuting volume of the citrus press 12 and the vessel 14 allows these all natural ingredients to steep directly with the beverage.

The citrus press 12 may be keyed in place and frictionally impinged between the drinking vessel 14 and bottom cap 28 in order to be secured during use. However, other methods for attaching and securing the citrus press 12 during use may be provided, including forming screw grooves about the outside perimeter in order to removably attach the press 12 directly to the bottom of the drinking vessel 14. The citrus press 12 may also be adapted to comprise a corking device for removably securing to a screw on vessel 72.

It is anticipated that a number of beverage options can exist, such as water, tea, or adult beverages or spirits. When adapted for use with drinking water, a upper opening 24 can form a drinking spout to provide a spill-proof lid. When adapted for use with tea or other steeped beverages, the drinking vessel 14 may further include a café cap (not shown) that allows for spill-proof sipping. When adapted for use in bartending, similar accommodation can be provided to allow for use with liquors and even wine.

Figure 1:
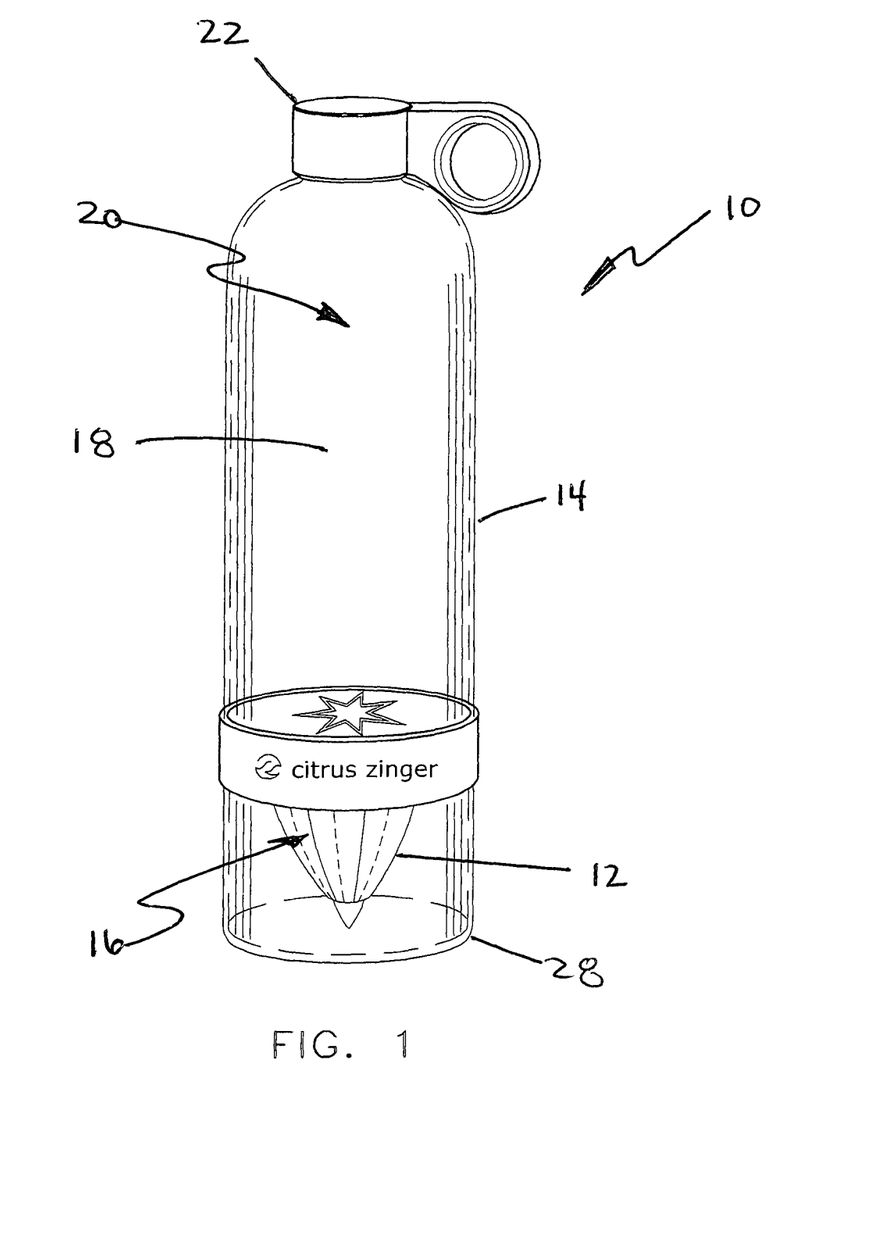
FIG. 1 is a front perspective view of a hand grinding citrus press in combination with a liquid drinking vessel according to the preferred embodiment of the present invention.
Figure 2:
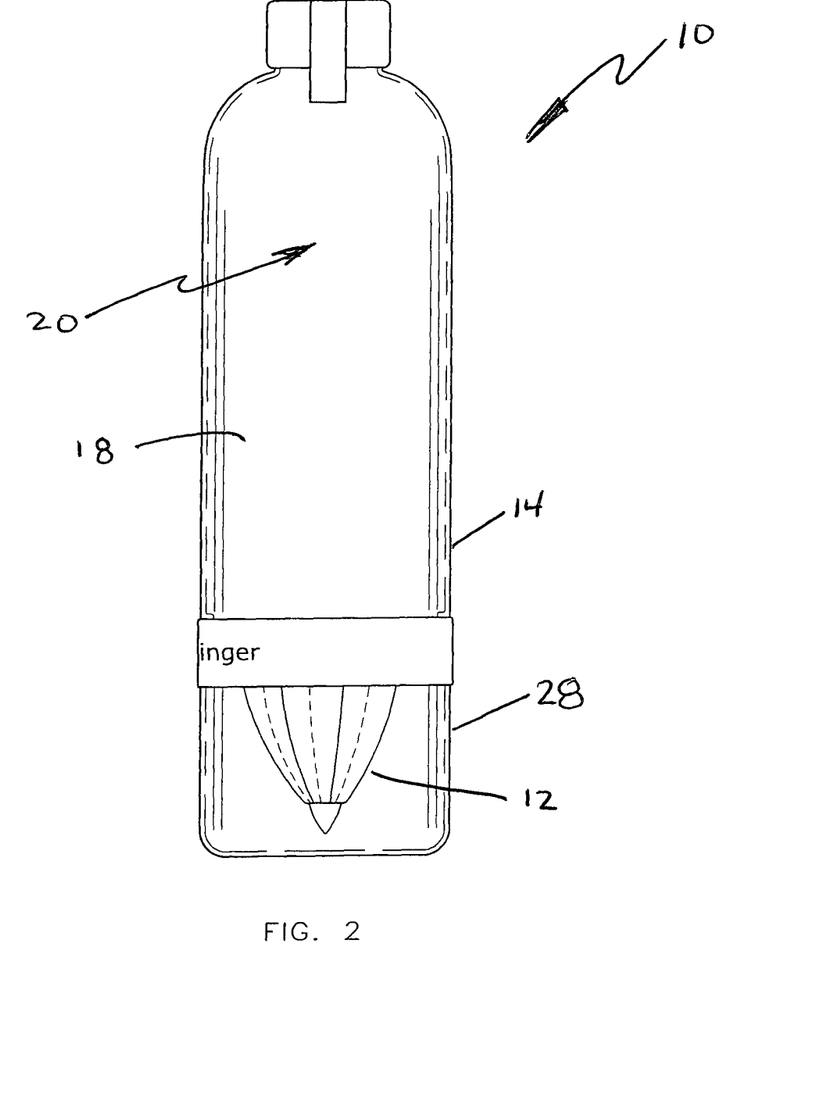
FIG. 2 is a front elevational view thereof.
Figure 3:
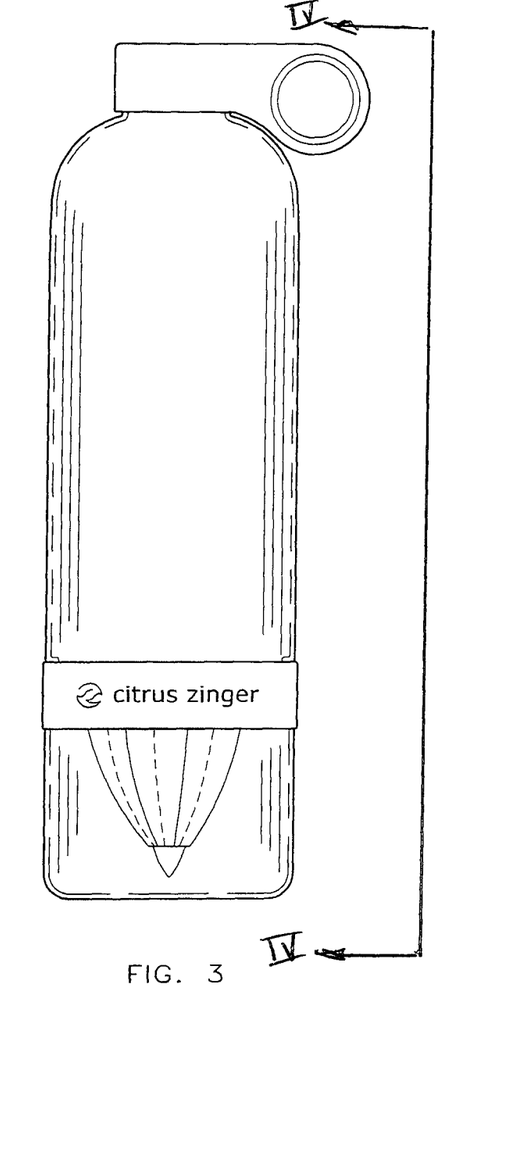
FIG. 3 is a left side elevational view thereof, the opposite side being a mirror image.
Figure 4:
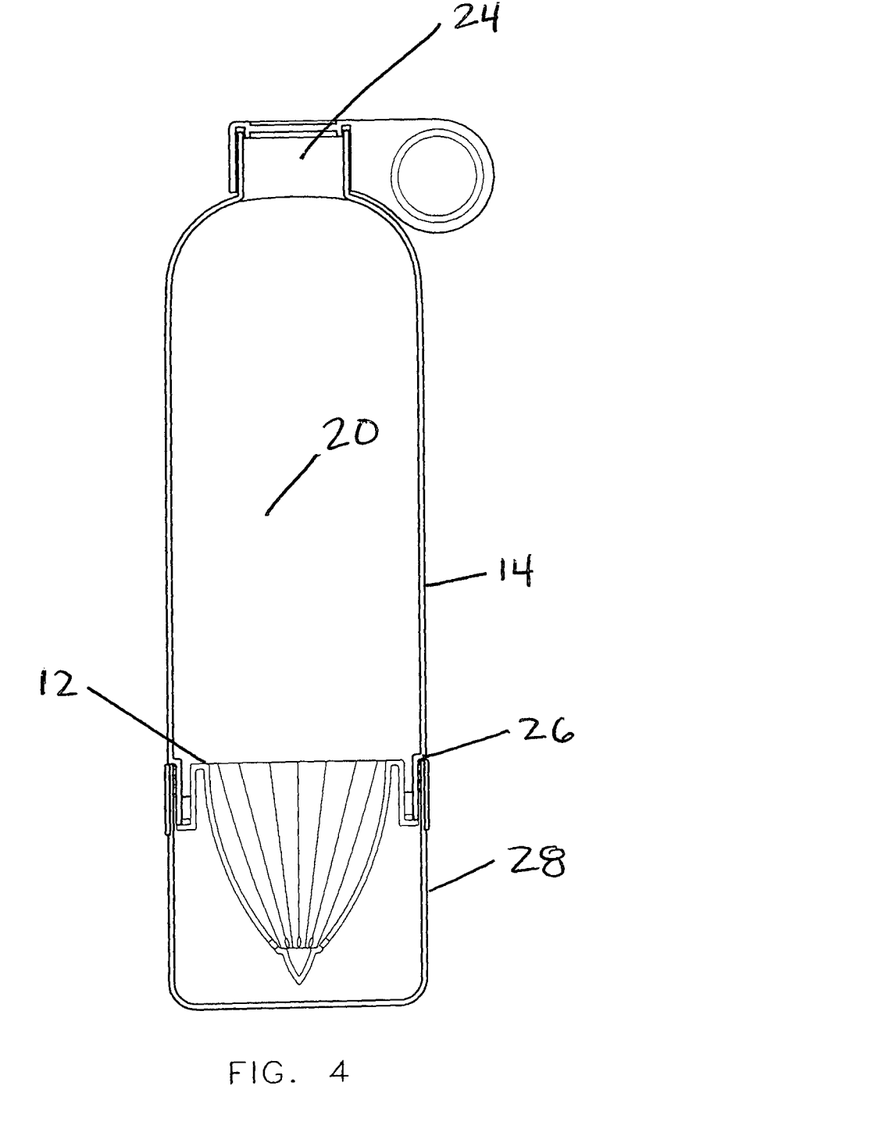
FIG. 4 is a cross sectional elevational view taken along line IV-IV of FIG. 3.
Figure 5:
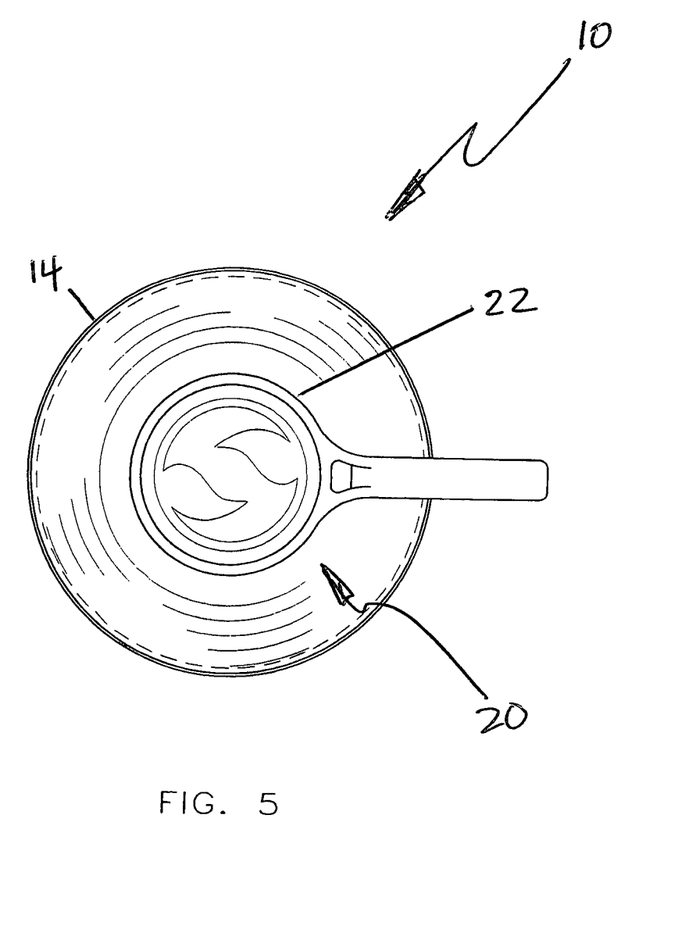
FIG. 5 is a top plan view thereof.
Figure 6:
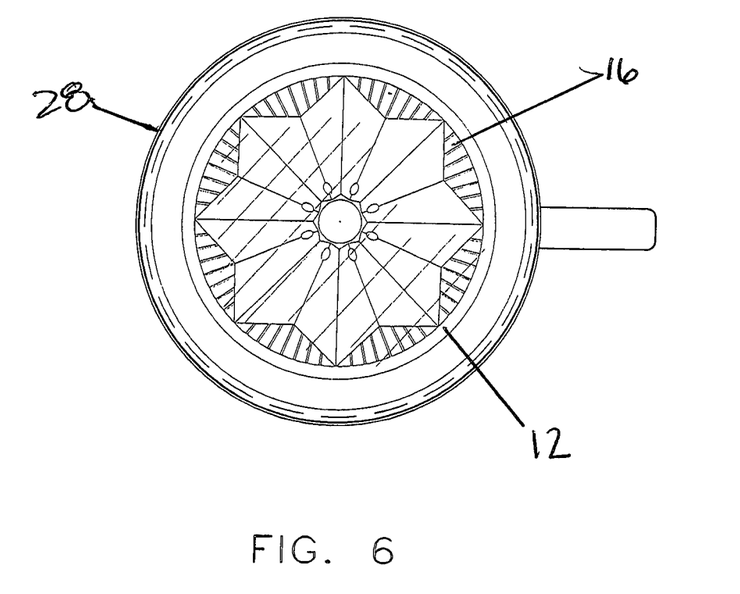
FIG. 6 is a bottom plan view thereof.
Figure 7A:
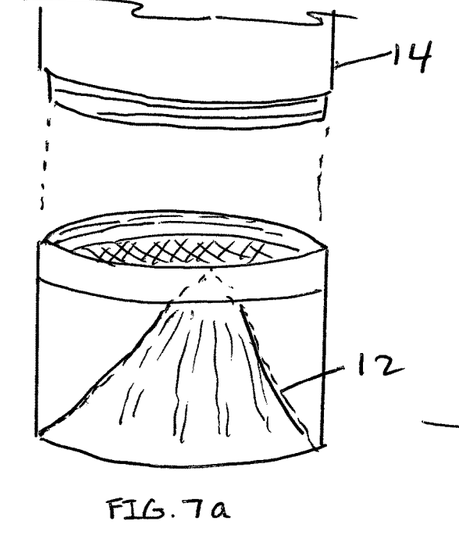
FIG. 7a is a partial exploded perspective view of a hand grinding citrus press in combination with a liquid drinking vessel according to the present invention depicting an alternate position arrangement.
Figure 7B:
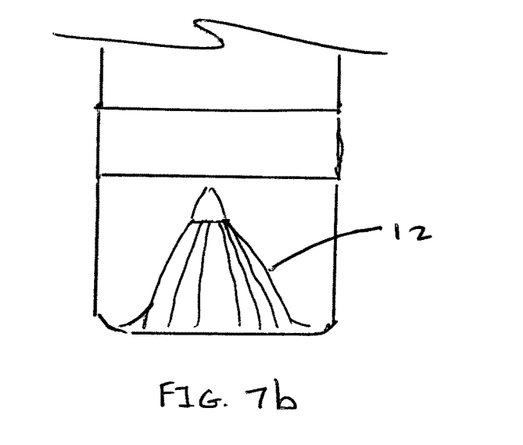
FIG. 7b is a cross sectional elevational view thereof.
Figure 7C:
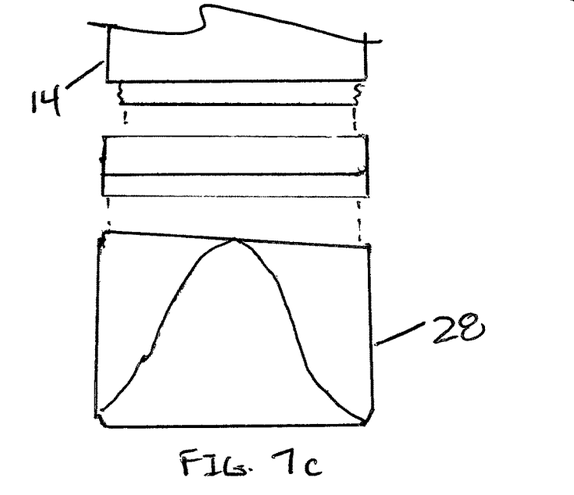
FIG. 7c is a partial exploded elevational view thereof.

Given this broad anticipation of functionality, it should be obvious to a person having ordinary skill in the relevant art to find that adaptations or changes to the form or particular intended use of the container 10 would be equivalent to the present invention, or merely a design choice or alteration, or both. In any embodiment, the drinking vessel 14 is operatively connected to the citrus press 12 and the citrus press 12 is removably connected to the liquid drinking vessel 14, as well as in fluid communication with the dispensing volume 20. While the embodiments presented herein are shown to anticipate the use of a bottom cap 28 affixing to or received by the bottom of the vessel 14, such embodiments were selected as preferred design choices that enable the present invention, but were not intended as being strict limitations. Placement of the citrus press 12 at the top, middle, or any specific orientation or configuration should be equivalent, given the fluid communication between the comminuted foodstuff and the dispensing volume 20 such that the extraction of edible and aromatic oils can directly blend with any liquid contents of the dispensing volume 20. As shown in FIG. 7a through FIG. 7b, one such variation of a hand grinding citrus press is shown in combination with a liquid drinking vessel depicting the citrus press 12 placed at lower inner surface of the bottom cap 28 in order be directed upwards during use.

2. Operation of the Preferred Embodiment

In accordance with a preferred embodiment of the present invention, as shown in either embodiment, the operation of the present invention is accomplished by placing citrus or other foodstuffs, such as fruit, in the bottom cap 28 and contained between the sieve 16. The assembly is then threadingly engaged onto the bottom of a vessel 14, and the vessel 14 filled with a dispensing volume 20. The user is now able to grind any fruit directly into the dispensing volume 20. This direct contact allowing the all natural ingredients to steep directly into the dispensing volume 20 creates refreshingly flavored drinks and directly capturing nutrients or edible or aromatic extracts. The infused liquid can be consumed or used directly or indirectly from the vessel 14, and can be refrigerated after mixing. When emptied, the old ingredient can be discarded and the assembly components washed in preparation for reuse.

The foregoing descriptions of specific multiple embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equiva-

What is claimed is:

1. A citrus essence extractor for comminuting of foodstuffs for the extraction and infusion of edible and aromatic oils comprising:
   a citrus press;
   a portable liquid dispensing container that is removably connected to and contains said citrus press, said liquid dispensing container further forming a sealed storage and dispensing fluid volume in continuous fluid communication with said citrus press to permit fluid to be freely exchanged between said citrus press and said liquid dispensing container through at least one opening such that the continuous blending of freshly extracted edible and aromatic oils from said citrus press is available directly within said liquid dispensing container;
   wherein said liquid dispensing container is operatively connected to said citrus press such that said citrus press removably connects to the liquid drinking vessel, as well as being in fluid communication with said dispensing volume.

2. The citrus essence extractor of claim 1, further comprising a separation mechanism between said contained citrus press and said liquid dispensing container, said separation mechanism having a permeability selected for permitting a desired barrier to the communication of pulp into said liquid container while permitting fluid communication.

3. The citrus essence extractor of claim 2, wherein said dispensing container further allows visual access to the dispensing volume.

4. The citrus essence extractor of claim 2, wherein said citrus press is positioned relative to said liquid dispensing container from an orientation selected from the group consisting of: above; below; or within.

* * * * *